United States Patent [19]
Classen

[11] Patent Number: 6,102,129
[45] Date of Patent: Aug. 15, 2000

[54] AERATOR

[75] Inventor: Larry Classen, Norfolk, Nebr.

[73] Assignee: Classen Enterprises, Inc., Norfolk, Nebr.

[21] Appl. No.: 09/320,644

[22] Filed: May 27, 1999

[51] Int. Cl.[7] .......................... A01B 33/02; A01B 45/02; A01B 33/08
[52] U.S. Cl. .......................... 172/21; 172/103; 172/123; 172/259
[58] Field of Search .................................. 172/21, 22, 61, 172/62, 103, 104, 123, 259, 256

[56] References Cited

U.S. PATENT DOCUMENTS

| 2,750,859 | 6/1956 | Smithburn | 172/103 X |
|---|---|---|---|
| 2,823,597 | 2/1958 | Kelsey | 172/103 X |
| 2,835,182 | 5/1958 | Smithburn | 172/103 X |
| 2,888,994 | 6/1959 | Hoff et al. | 172/103 |
| 5,680,903 | 10/1997 | Oliver | 172/22 |

Primary Examiner—Christopher J. Novosad
Attorney, Agent, or Firm—Sughrue, Mion, Zinn, Macpeak & Seas, PLLC

[57] ABSTRACT

A turf aerator is provided with two separate shafts, each having a plurality of tines mounted thereon for aerating the turf. Each shaft is selectively connected to an output shaft of a motor mounted on the frame of the aerator by two separate drive trains, each having a clutch arrangement therein. A pair of control levers are mounted on a handle assembly for operating the clutches in each drive train. Thus either or both of the tine carrying shafts may be rotated to facilitate a turning operation of the aerator or facilitating the operation of the aerator while traversing a sloping surface.

6 Claims, 6 Drawing Sheets

AERATOR

BACKGROUND OF THE INVENTION

The present invention is directed to an aerator for aerating lawns and more specifically to a split drive arrangement for selectively rotating either half of the plugging tines or rotating all of the tines simultaneously.

Core type aerators are well known in the art and are generally comprised of a walk behind unit having a main frame with an internal combustion engine mounted on the top thereof. The transverse shaft is rotatably mounted adjacent the lower rear portion of the frame and has a plurality of disks secured thereto which in turn support a plurality of radially extending core tines. A suitable drive arrangement is provided between the output shaft of the motor and the tine carrying shaft. In many models of core aerators, a drum capable of being filled with water is rotatably supported adjacent the lower front portion of the frame. Suitable drive means are provided between the motor and the drum for imparting a drive to the drum.

A pair of wheels are pivotally mounted on opposite sides of the frame adjacent the rear thereof which may be adjustable in height under the control of an operator walking behind the aerator. A steering handle is mounted on the frame and extends rearwardly from the frame. Suitable controls are provided on the handle for controlling the drive to the shaft carrying the core tines and the water drum. Additional controls are provided on the handle for raising and lowering the wheels to control the depth of penetration of the core tines as the aerator traverses the turf.

In most models of turf aerators, all of the tine carrying disks are simultaneously rotated since they are mounted on a single transverse shaft to which the drive is imparted. At least one turf aerator model is provided wherein the outermost tine carrying disks are mounted on the shaft for a free wheeling operation.

SUMMARY OF THE INVENTION

The present invention provides a new and improved turf aerator wherein the tine carrying disks are mounted on a split shaft so that each half of the shaft is selectively rotated by the motor by means of a separate clutch mechanism. In this way, either half shaft can be rotated or both half shafts can be simultaneously rotated. A throttle control means is also provided for actuation each time the clutch for either half shaft is engaged or when both clutches are simultaneously engaged.

The specific nature of the invention, as well as advantages thereof will clearly appear from the following description and from the accompanying drawings.

BRIEF DESCRIPTION OF THE DRAWING FIGURES

DETAILED DESCRIPTION OF THE INVENTION

Figure 1:
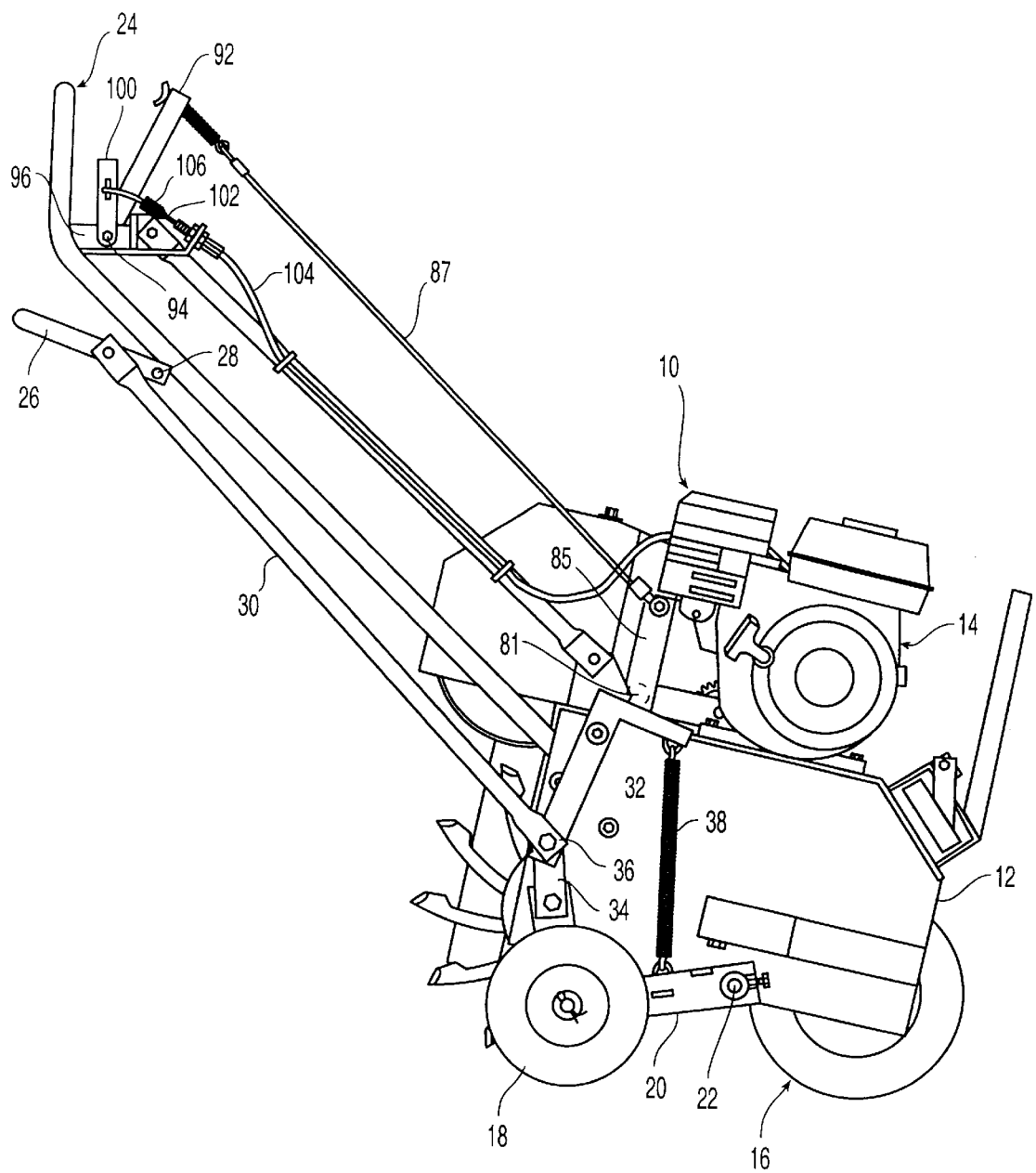
FIG. 1 is a side view of a lawn aerator according to the present invention.

The lawn aerator 10 shown in FIG. 1 is comprised of a main frame 12 having an internal combustion engine 14 mounted on the upper portion thereof. A hollow drum 16, adapted to be filled with water, is rotatably mounted adjacent the lower front end of the main frame 12. A pair of wheels 18, only one of which is shown in FIG. 1, are rotatably mounted on respective arms 20 which in turn are pivotally mounted on the main frame 12 at 22.

A main guiding handle 24 is mounted on the main frame 12 and extends rearwardly and upwardly therefrom. A U-shaped control lever 26 is pivotally mounted to the handle 24 at 28 for raising and lowering the wheels 18. The lever system for controlling each wheel 18 is identical for each wheel and the lever system for controlling the right hand wheel is shown in FIG. 1. The lever system is comprised of a main control link 30 connected between the U-shaped lever 26 and a pair of levers 32 and 34 at a common pivot axis 36. The lever 32 is pivotally mounted on the main frame 12 and the lever 34 is pivotally connected to the wheel assembly 18. A tension spring 38 is connected between the lever 32 and the support lever 20. Upon pivotal movement of the U-shaped control lever 26, the wheels 18 may be raised and lowered to the desired height relative to the main frame 12. Such a linkage arrangement is old and well known in the art and accordingly is not described in further detail.

A pair of tine supporting shafts 40 and 42 are rotatably supported by bearing assemblies 44 and 46, which in turn are mounted to the main frame 12 at opposite sides of the aerator. Three spaced apart disks 48 are secured to each shaft 40 and 42 for rotation therewith and a plurality of hollow plug tines 50 are secured to each disk 48 by means of bolts 52. The number of tines 50 supported on each disk 48 may vary. Six tines 50 have been illustrated as being mounted on the disk 48 in FIG. 3.

The raising of the wheels 18 as described previously, will lower the rear end of the main frame 12, thereby determining the depth of penetration of the tines into the turf as the aerator moves across the lawn.

Figure 3:
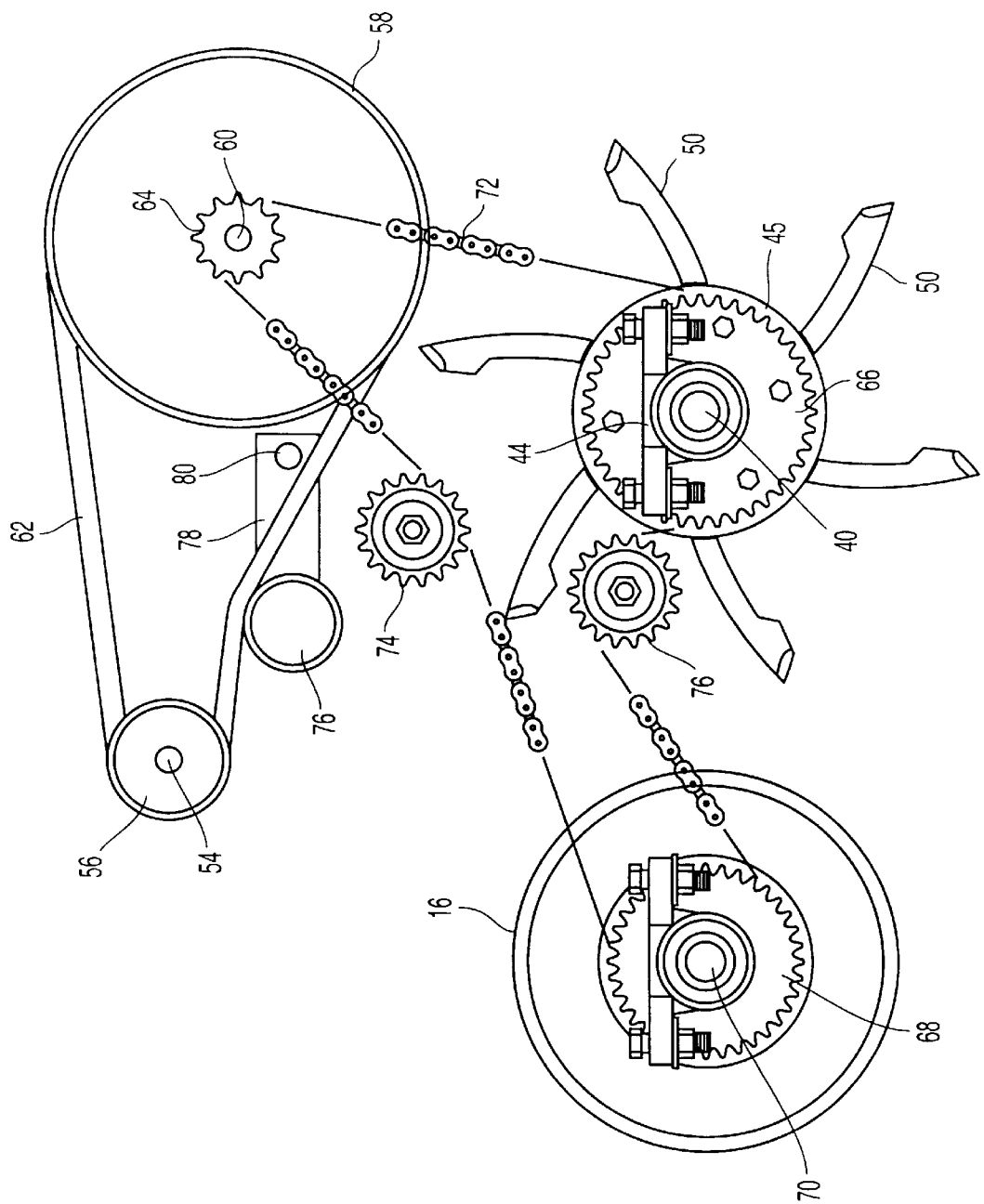
FIG. 3 is a schematic illustration of the drive train of the lawn aerator, separate from the principle aerator construction.

The shafts 40 and 42 are rotated by means of independent drive trains which in turn are powered by the motor 14. The output shaft 54 of the internal combustion engine 14, as shown in FIG. 3, has a pair of identical pulleys 56 mounted thereon, as best seen in FIGS. 3 and 8. The left hand drive train, as viewed from the rear of the aerator, will be described in detail with respect to FIGS. 3, 7 and 8. A large diameter pulley 58 is rotatably mounted on a transverse shaft 60, which is mounted in the main frame 12 parallel to the tine supporting shaft 40. A V-belt 62 extends about the small diameter pulley 56 and the large diameter pulley 58 for imparting rotation to the pulley 58.

A sprocket 64 is mounted on the shaft 60 for rotation therewith. A larger diameter sprocket 66 is mounted on the tine supporting shaft 40 for rotation therewith and a large diameter sprocket 68 is mounted on the shaft 70 to which the drum 16 is secured for rotation therewith. An endless chain 72 is entrained about the sprockets 64, 66 and 68 for imparting rotation to the splines mounted on the shaft 40 and to the drum 16 mounted on the shaft 70. A pair of idler sprockets 74 and 76 engage the chain 72 for purposes of tensioning the chain.

A clutch in the form of an idler pulley 76 is rotatably mounted on a lever 78, which in turn is mounted on a shaft 80 extending parallel to the shaft 60. Upon pivotal movement of the lever 78, which will be described hereinafter, to the position shown in FIG. 3, the pulley 76, which engages the drive belt 62, will tighten the belt onto the pulleys 56 and 58 for the purpose of imparting a drive from the engine shaft 54 to the belt 62 through the pulley 56. When the lever 78 is pivoted on the shaft 80 in the counterclockwise direction, the belt 62 will be loosened on the pulley 56 and no drive will be imparted to the pulley 58. Likewise, no power will be transmitted to the drum 16 and the tine shaft 40.

Figure 7:
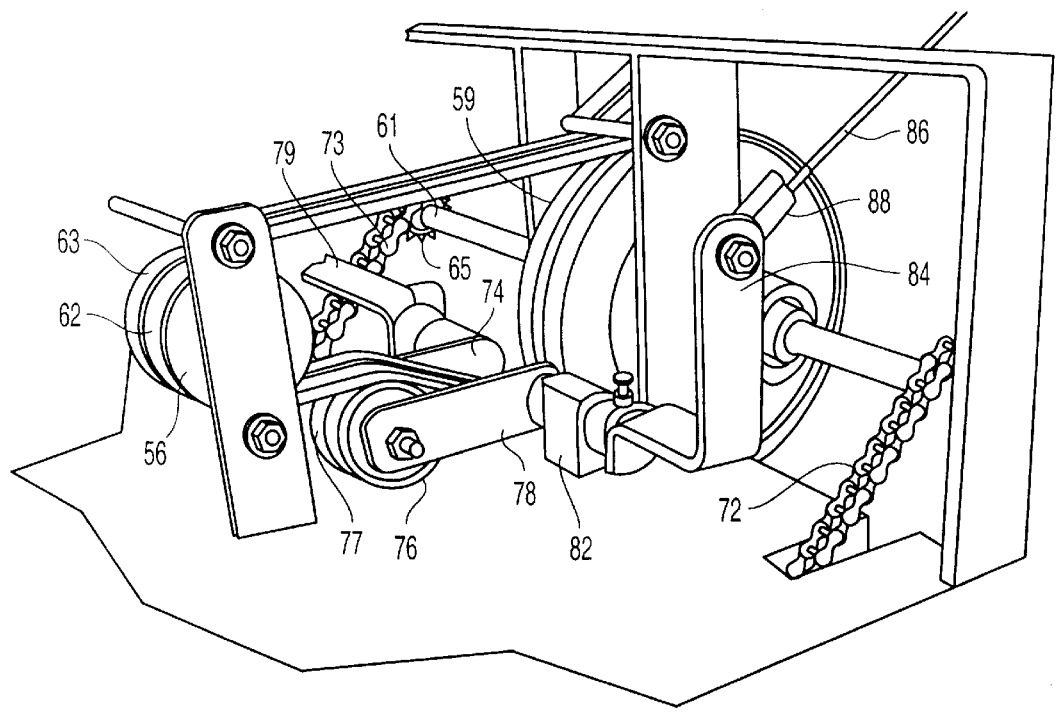
FIG. 7 is a perspective view of the clutch assemblies for controlling power to the left and right hand sets of tines.
Figure 8:
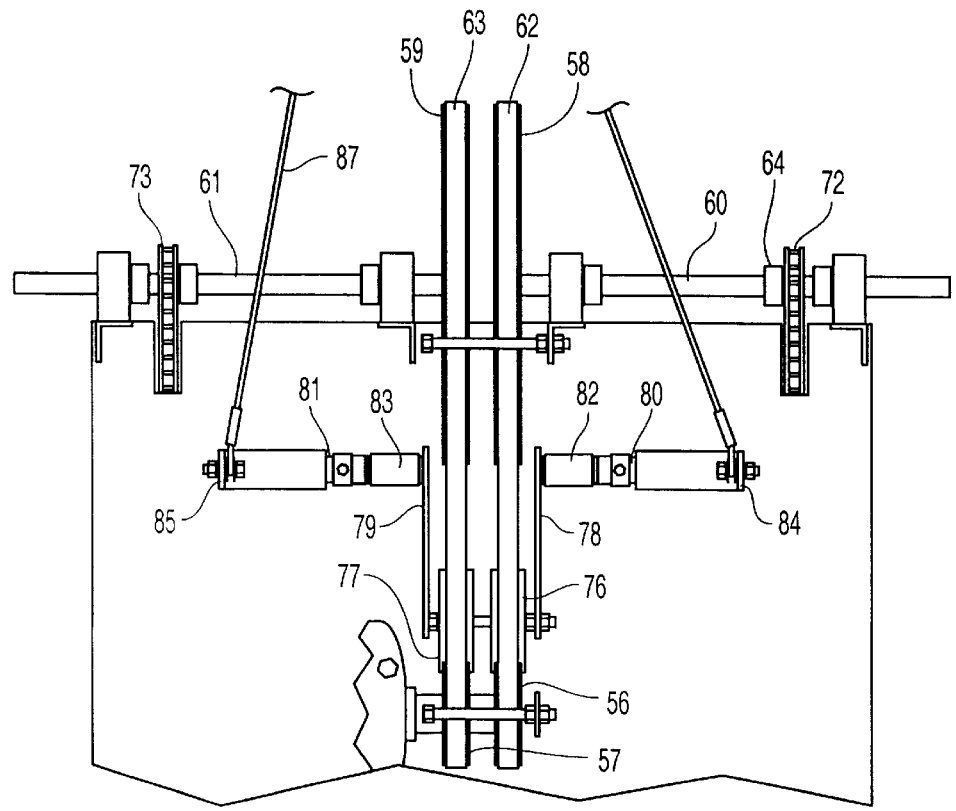
FIG. 8 is a top view of the clutch assemblies shown in FIG. 7.

The lever 78, as shown in FIG. 7, is mounted on a shaft 80 journaled in a bearing assembly 82 mounted on the main frame 12. A lever 84 is secured to the opposite end of the shaft 80 and is substantially vertically disposed as shown in FIG. 7. One end of a control cable 86 is connected to the upper end of the lever 84 by means of a nut and bolt assembly 88. The control cable 86 will be manipulated as described hereinafter for imparting rotation to the shaft 80 to engage and disengage the pulley 76, with respect to the belt 62.

Figure 2:
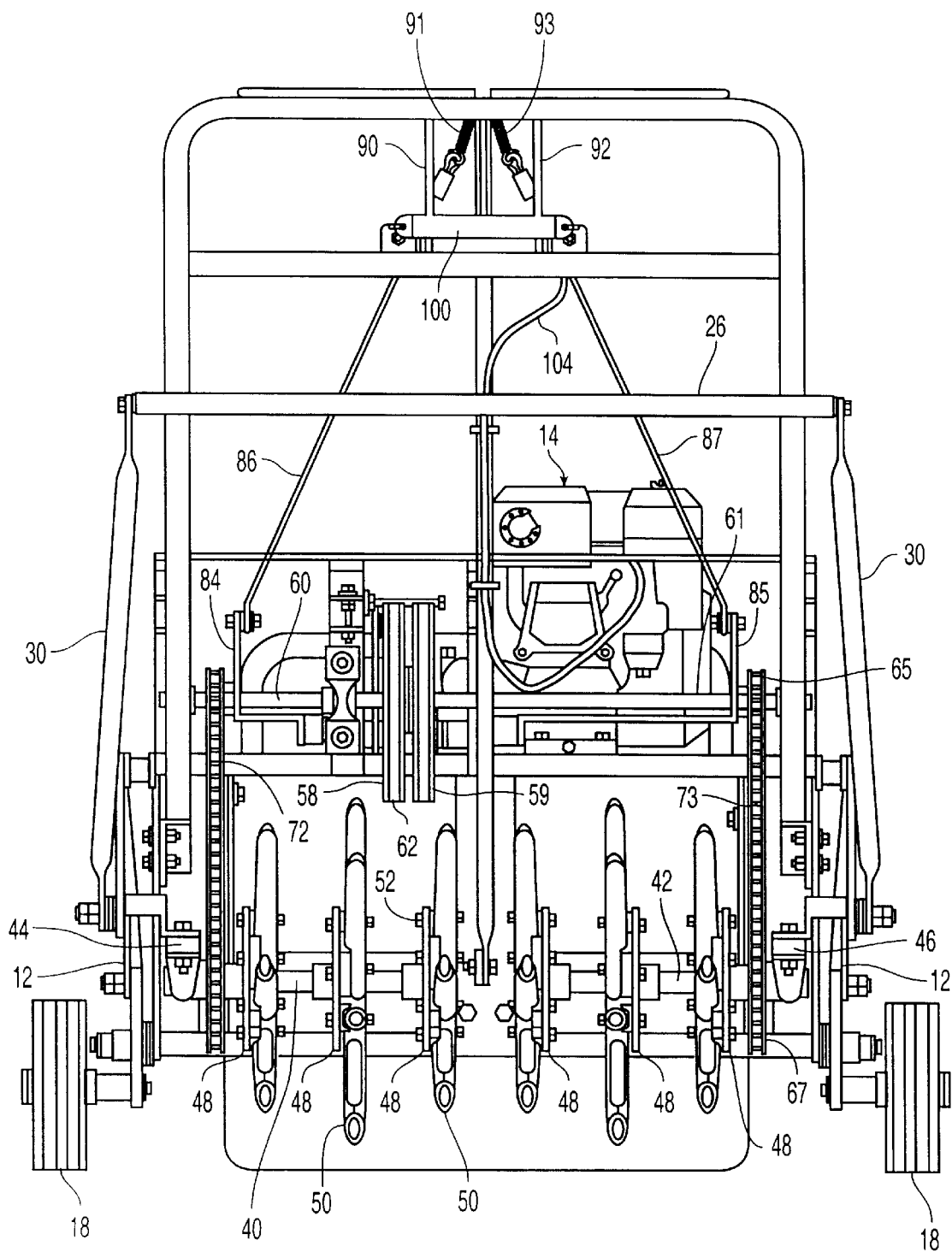
FIG. 2 is a rear view of the lawn aerator shown in FIG. 1.

A duplicate drive assembly is provided from the motor shaft 54 to the right hand tine shaft 42. A pulley 57 is mounted on the motor shaft next to the pulley 56 and a belt 63 is entrained about the pulley 57 and a larger diameter pulley 59 mounted on the shaft 61 which extends parallel to the motor shaft and in axial alignment with the shaft 60. A sprocket 65 is mounted on the shaft 61 and a sprocket 67 is mounted on the shaft 42. A drive chain 73 is entrained about the sprockets 65 and 67 for imparting a drive from the shaft 61 to the shaft 42 for rotating the right hand set of tines as shown in FIG. 2.

In order to engage and disengage the drive belt 63 with the pulleys 57 and 59, a lever 79 is mounted on a shaft 81 supported by a bearing 83 on the main frame. The shaft 81 is in alignment with the shaft 80 on the opposite side and an operating lever 85 is connected to the shaft 81 for operation by a control cable 87.

The control cables 86 and 87 are connected to control levers 90 and 92, respectively through tension springs 91 and 93. The control levers 90 and 92 are pivotally mounted on a shaft 94 which is supported by means of a U-shaped bracket 96 which is mounted on and projects forwardly from a transversely extending bar 98 on the handle 24. Each of the control levers 90 and 92 are operable independently of each other whereby the drive from the engine 14 may be selectively transmitted to either the left bank of tines mounted on the shaft 40 or on the right bank of tines mounted on the shaft 42. Upon pivotal movement of the control lever 90 toward the handle 24, the tension pulley 76 will be pivoted into engagement with the belt 62 to transmit drive from the engine output shaft 54 to the shaft 40. Upon pivotal movement of the control lever 92 toward the handle 24, the tension pulley on the lever 79 will be pivoted into engagement with the drive belt 63 to impart drive to the tine shaft 42.

An alternative arrangement of the control cable 86 and 87 is possible. When it is desired to turn the aerator to the right in the process of turning the aerator around by 180°. The left hand set of tines on the shaft 40 should be driven with no drive to the right hand shaft. This will facilitate a turning movement to the right. Since it would be more logical to actuate the right hand control lever 92 to initiate a turn to the right, the cable 87 could be connected between the right hand control lever 92 to the left hand lever 84 to control the drive to the left hand shaft 40. Likewise, the cable 86 would be connected between the left hand control lever 90 and the lever 85 to control the drive to the right hand shaft 42. Thus, upon actuation of the left hand control lever 90, a drive can be imparted to the right hand shaft 42 to facilitate a left turn of the aerator.

When traversing a relatively steep slope, the down-hill set of tines should be driven while the up-hill set of tines are not driven. This will facilitate the maintaining of a straight line while traversing the steep slope.

Also pivoted on the shaft 94 is a throttle control lever 100. A throttle control cable 102 extends through a protective sheath with one end of the cable 102 being connected to the engine throttle (not shown) in a conventional manner and the opposite end connected to the throttle control lever 100 through a coil spring 106. Pivotal movement of either control lever 90 or 92 toward the handle 24 will cause the control lever to engage the throttle lever 100 to move the throttle control lever 100 toward the handle 24. Thus, upon actuation of either or both control levers 90 and 92 to cause rotation of either or both shafts 40 and 42, the throttle will be operated to increase the engine speed, thereby compensating for the additional load applied to the engine.

Figure 4:
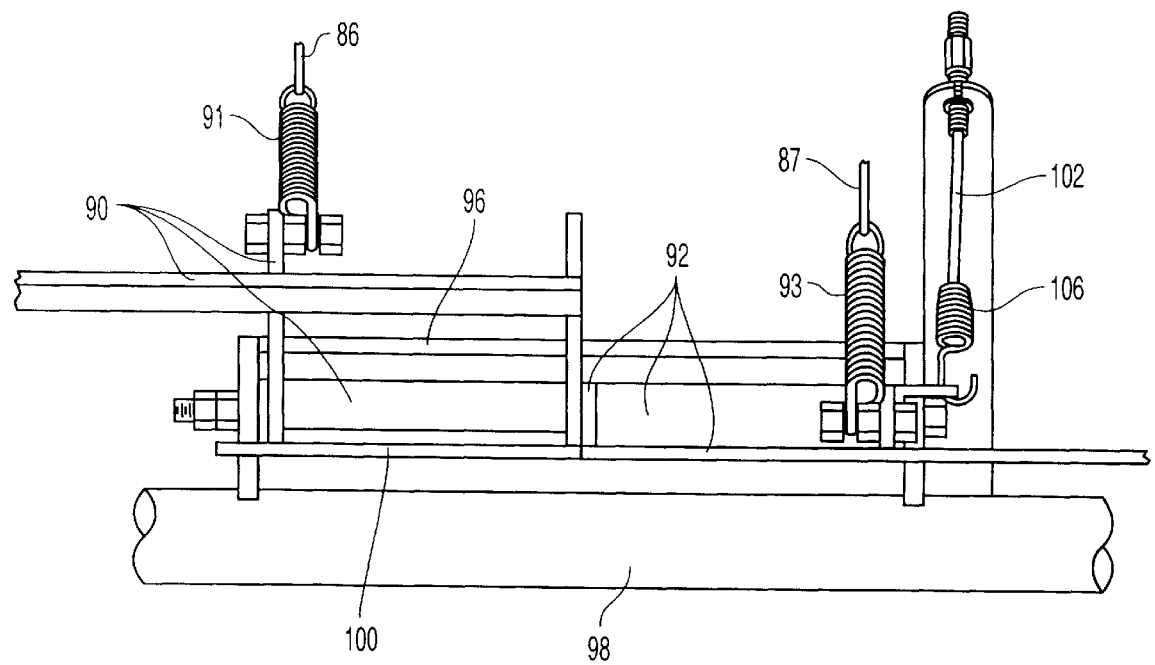
FIG. 4 is a partial view of the handle showing the clutch and throttle control levers with the clutch operating lever for controlling the right hand set of tines in the clutch engaging position.
Figure 5:
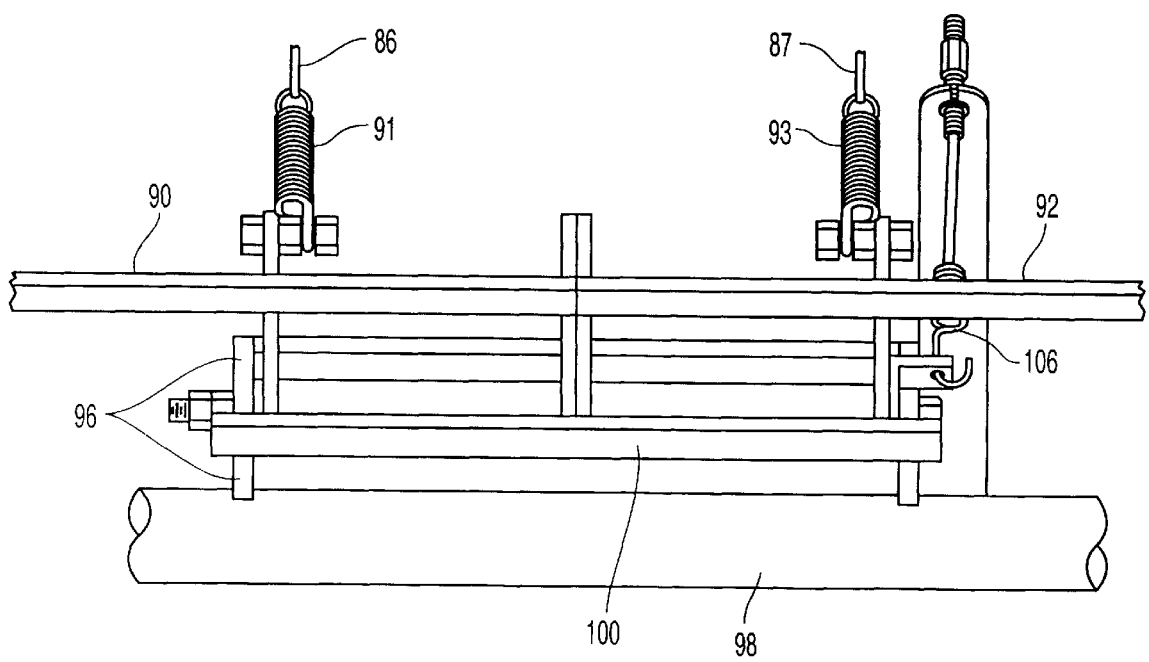
FIG. 5 is a view similar to FIG. 1 with both clutch actuating levers in the disengaged position.
Figure 6:
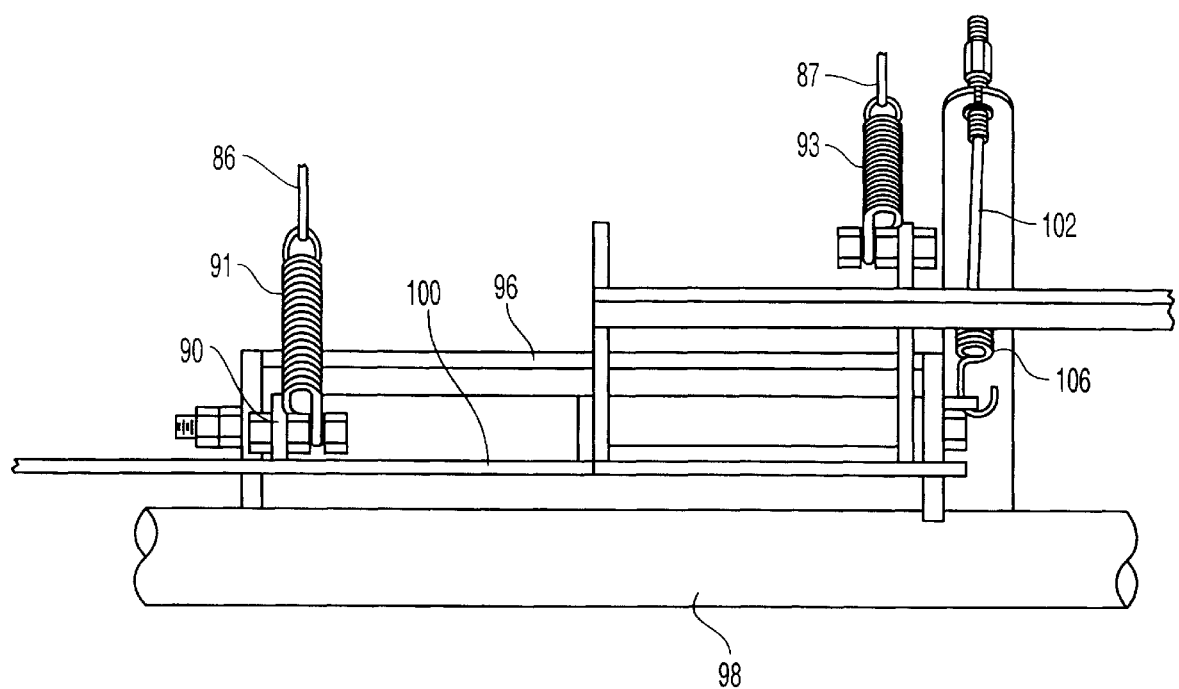
FIG. 6 is a view similar to FIG. 4 with the clutch lever for controlling the left hand set of tines in the clutch engaging position.

FIG. 4 shows the right hand control lever 92 pivoted toward the handle 24 in engagement with the throttle control lever 100. FIG. 5 shows both control levers 90 and 92 in the rest position whereby no drive will be imparted to the tine shafts 40 and 42 and the engine speed will be reduced. In FIG. 6, the left hand control lever 90 is shown in the pivoted operative condition to rotate the left hand tine shaft 40 and increase the engine speed.

While the preferred embodiments have been described, variations thereto will occur to those skilled in the art within the scope of the present inventive concepts which are delineated by the following claims.

What is claimed is:

1. A turf aerator comprising a frame, motor means for driving the aerator, a pair of aerator shafts rotatably mounted in said frame, each having a plurality of tines mounted thereon for aerating the turf and drive means operatively connected between said motor means and said shafts for selectively driving either shaft or both shafts simultaneously.

2. An aerator as set forth in claim 1, wherein said motor means has an output shaft and said drive means is comprised of two separate drive trains connected between said output shaft and said aerator shafts with each drive train having a selectively actuatable clutch assembly for controlling transmission of power from said output shaft to said aerator shafts.

3. An aerator as set forth in claim 2, further comprising handle means mounted on said frame for guiding said aerator over the turf and two control assemblies mounted on said handle means and operatively connected to said clutch means in respective drive trains for selectively operating said clutch means.

4. An aerator as set forth in claim 3, further comprising additional control means mounted on said handle and connected to said motor means for controlling the speed of rotation of said output shaft, said additional control means being engageable by and actuated by either of said control means for automatically increasing the speed of rotation of said output shaft of said motor means upon engagement of either clutch means.

5. An aerator as set forth in claim 1, further comprising hollow drum means rotatably mounted on said frame and drive means operatively connected between said drum and one of said tine shafts for imparting a drive to said drum upon rotation of said tine shaft.

6. An aerator as set forth in claim 1, further comprising extendible and retractable wheels mounted on opposite sides of said frame for controlling the depth of penetration of said tines and lever means mounted on said handle bar and connected to said wheels for raising and lowering said wheels.

\* \* \* \* \*